United States Patent
Zhao

(10) Patent No.: US 7,554,284 B2
(45) Date of Patent: Jun. 30, 2009

(54) INDUCTANCE CONTACTLESS STARTER

(75) Inventor: Yunwen Zhao, Jiangsu (CN)

(73) Assignee: Changshu Tianyin Electromechanical Co., Ltd., Jiangsu (CN)

( * ) Notice: Subject to any disclaimer, the term of this patent is extended or adjusted under 35 U.S.C. 154(b) by 21 days.

(21) Appl. No.: 11/579,242

(22) PCT Filed: Feb. 18, 2005

(86) PCT No.: PCT/CN2005/000198

§ 371 (c)(1),
(2), (4) Date: Oct. 31, 2006

(87) PCT Pub. No.: WO2006/056106

PCT Pub. Date: Jun. 1, 2006

(65) Prior Publication Data

US 2008/0018294 A1    Jan. 24, 2008

(30) Foreign Application Priority Data

Nov. 24, 2004   (CN) .................. 2004 1 0065370

(51) Int. Cl.
*H02P 1/42* (2006.01)

(52) U.S. Cl. .................. 318/787; 318/774; 318/778; 318/786

(58) Field of Classification Search .............. 318/786, 318/787, 788, 791, 792, 774, 781
See application file for complete search history.

(56) References Cited

U.S. PATENT DOCUMENTS

| | | | | | |
|---|---|---|---|---|---|
| 3,573,579 | A | * | 4/1971 | Lewus | 318/787 |
| 3,657,619 | A | * | 4/1972 | Love | 318/787 |
| 3,667,017 | A | * | 5/1972 | Ramirez | 318/787 |
| 3,916,274 | A | | 10/1975 | Lewus | |
| 4,307,327 | A | * | 12/1981 | Streater et al. | 318/786 |
| 4,375,613 | A | * | 3/1983 | Fuller et al. | 318/786 |
| 4,574,229 | A | * | 3/1986 | Kim | 318/788 |
| 5,391,971 | A | * | 2/1995 | Yamada et al. | 318/778 |
| 5,451,853 | A | * | 9/1995 | Itoh | 318/788 |
| 5,952,811 | A | * | 9/1999 | Hamatani | 318/788 |

(Continued)

FOREIGN PATENT DOCUMENTS

CN         1052228 A    6/1991

(Continued)

*Primary Examiner*—Bentsu Ro
*Assistant Examiner*—Thai Dinh
(74) *Attorney, Agent, or Firm*—Knobbe, Martens, Olson & Bear, LLP

(57) ABSTRACT

An inductive contactless starter for single-phase AC motor, comprising a current inductor and a triac; wherein, one terminal of secondary coil of said current inductor is connected to the gate electrode of said triac, the other terminal is both connected to the first electrode of said triac and the terminal of secondary winding of the motor, and the two terminals of primary coil of said current inductor are connected to the motor and the power supply. By sampling relevant current signals with said current inductor, the invention can control heat loss of the current sampling system effectively down to milliwatt level (i.e., the starter is a "zero power loss" starter for single-phase AC motors), and thereby improve energy efficiency greatly; in addition, the invention has a simple circuit and fewer components and is reliable, improving reliability of the electric starter system while delivering electric starting function.

5 Claims, 4 Drawing Sheets

U.S. PATENT DOCUMENTS

| | | | |
|---|---|---|---|
| 6,479,961 B1 * | 11/2002 | Berwanger | 318/778 |
| 6,570,359 B2 * | 5/2003 | Dubhashi | 318/786 |
| 6,930,464 B2 * | 8/2005 | Han et al. | 318/781 |
| 7,061,204 B2 * | 6/2006 | Unno | 318/786 |
| 7,391,179 B2 * | 6/2008 | Zhao | 318/788 |

FOREIGN PATENT DOCUMENTS

| | | |
|---|---|---|
| CN | 2234146 Y | 8/1996 |
| CN | 2239677 Y | 11/1996 |
| CN | 2412319 Y | 12/2000 |
| JP | 10-094279 | 4/1998 |

* cited by examiner

INDUCTANCE CONTACTLESS STARTER

CROSS-REFERENCE TO RELATED APPLICATIONS

This application is a national stage application under 35 U.S.C. § 371 of PCT Application No. PCT/CN2005/000198 designating the United States, filed Feb. 18, 2005. The PCT Application was published in Chinese as WO 2006/056106 A1 on Jun. 1, 2006 and claims the benefit of the earlier filing date of Chinese Patent Application No. 200410065370.X, filed Nov. 24, 2004. The contents of Chinese Patent Application No. 200410065370.X and International Application No. PCT/CN2005/000198 including the publication WO 2006/056106 A1 are incorporated herein by reference in their entirety.

FIELD OF THE INVENTIONS

The present inventions relate to inductive contactless starters mainly designed to start compressor motors or ordinary single-phase AC motors.

BACKGROUND OF THE INVENTIONS

Single-phase AC motors usually comprise a rotor and stator composed of primary and secondary windings. These secondary windings are not only used to start the motor but also work during normal operation of the motors. Therefore, the complete secondary winding circuit of single-phase AC motors can be represented with a secondary winding operation circuit and a secondary winding starting circuit shunted to each other.

A motor in which the secondary winding doesn't work during normal operation of the motor doesn't have the secondary winding operation circuit portion. In these motors, the secondary winding starting circuit portion only works at startup of the motor and has to be disconnected after motor startup. Conventionally, disconnection of the secondary winding starting circuit is usually implemented with a Positive Temperature Coefficient (PTC) component. When the motor starts, the starting circuit works, and the starting current in the secondary winding flows through the PTC component, causing the PTC component to generate heat and the resistance increases quickly, and finally disconnects the starting circuit essentially.

During normal operation of the motor, there is a small current passing through the PTC component persistently, to maintain the thermal resistance of the PTC component and thereby prevent the motor starting circuit from acting. The power loss for maintaining heat generation in the PTC component is usually about 3W. Since such motors are widely used, the heat loss results in severe waste of electric energy.

In China Patent Application CN1052228A, an electronic circuit for starting single-phase inductive motors is disclosed. By utilizing a triac that gates on in normal state and gates off by timing in the motor starting circuit and associated gate-on/gate-off circuits, the switching of the motor starting circuit from closed at power-on to time-lagged open is implemented, and thereby motor startup is implemented. However, in the typical starter application case, the motor has to start intermittently and frequently during long term operation. However, the circuit employs many discrete components, which severely degrade reliability of the starting circuit, for example, the working current of several milliamperes passes through the resistance components used in the gate-on circuit and multiple transistors used in the time-lagged gate-off circuit. Furthermore, the entire electronic circuit operates in the complex motor operating circuit and is not isolated from the complex electrical environment effectively. As the result, the entire weak light-current circuit system is not protected well, bringing severe adverse effects to reliability of the entire motor system.

In addition, the triac used in the circuit requires resetting the timer before the motor starting circuit is closed, i.e., the power to the timer circuit must be cut so that the capacitor of the timer discharges for a certain time before the triac can gate off again after a time lag; otherwise the triac will be always in gate-off state as long as there is current in the gate-on/time-lagged gate-off circuits, and thereby can't implement motor switching from non-operation low-current state to start state.

The invention disclosed in Japan Patent Document JP10094279 utilizes the principle that the current in a motor during startup is different to that in normal operation and utilizes a current detection resistor in the main motor circuit to convert the main circuit current (total current in motor) signal into a voltage signal. In addition, that invention utilizes a "reference current setter" and a "current comparison circuit" to compare the main circuit current signal with the preset current value, and uses the comparative result to control gate-on/gate-off of the triac connected in the motor starting circuit, and thereby attain the object of control open/close of the starting circuit.

However, the resistor used in this circuit samples the current signal in the main motor circuit into a voltage signal. Since the resistor is a pure resistive component and the current in the main motor circuit is usually at the ampere level or near ampere level, the resistor will cause heat loss at watt level or near watt level during the entire motor operation process. Though the circuit can start the motor, it degrades energy utilization ratio severely. Furthermore, the circuit utilizes auxiliary circuits such as "reference current setter" and "comparison circuit", all of which degrades reliability of motor startup function to a certain degree.

SUMMARY OF INVENTIONS

An object of at least some of the present inventions is to provide an inductive contactless starter for single-phase AC motor, featured with high reliability and low power loss.

Thus, in accordance with an embodiment, an inductive contactless starter for single-phase AC motor can be provided. The motor can comprise a stator composed of at least a primary winding and a secondary winding, the motor being configured such that a permanently operating capacitor can be connected between the outlet terminals of the primary and secondary windings. The inductive contactless starter comprising a current mutual-inductor having at least a primary coil, a secondary coil, and a triac having a gate electrode, a first electrode, and a second electrode. One terminal of the secondary coil of the current mutual-inductor can be connected to the gate electrode of the triac, and the other terminal of the secondary coil can be connected to the first electrode of the triac and an outlet terminal of the secondary winding of the motor. One terminal of the primary coil of the current mutual-inductor can be connected to a first power terminal and one terminal of a PTC resistor, and the other terminal can be connected to an outlet terminal of primary winding of the motor. The other terminal of the PTC resistor can be connected to the second electrode of the triac.

In accordance with another embodiment, an inductive contactless starter for single-phase AC motor can be provided. The motor can comprise a stator composed of at least a primary winding and a secondary winding. The inductive contactless starter can comprise a current mutual-inductor having at least a primary coil, a secondary coil, and a triac having a gate electrode, a first electrode, and a second electrode. One terminal of the secondary coil of the current mutual-inductor can be connected to the gate electrode of the triac, and the other terminal of the secondary coil can be connected to the first electrode of the triac and an outlet terminal of the secondary winding of the motor. One terminal of the primary coil of the current mutual-inductor can be connected to a power terminal and one terminal of a PTC resistor, and the other terminal can be connected to an outlet terminal of primary winding of the motor. The other terminal of the PTC resistor can be connected to the second electrode of the triac.

By sampling relevant current signals with the current mutual-inductor, the starter can effectively control heat loss of the current sampling system down to milliwatt level (i.e., the starter can be considered a "zero power loss" starter for single-phase AC motor), and thereby improves energy efficiency greatly. In addition, the starter can have a simple circuit, fewer components, and can be more reliable, improving reliability of the motor starting system while delivering motor starting function.

BRIEF DESCRIPTION OF THE FIGURES

The above-mentioned and other features of the inventions disclosed herein are described below with reference to the drawings of preferred embodiments. The illustrated embodiments are intended to illustrate, but not to limit the inventions. The drawings contain the following Figures.

DESCRIPTION OF THE PREFERRED EMBODIMENTS

Several embodiments of an inductive contactless starter for single-phase AC motor are shown in the portion of the attached drawings enclosed by a polygon in dotted line, an associated motor MD being represented by a circle in dotted line.

Figure 1:
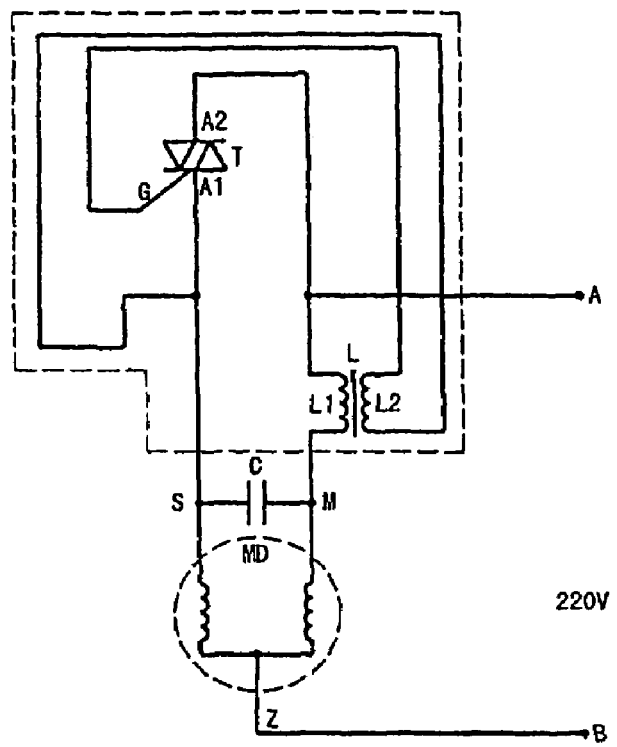
FIG. 1 is an electrical schematic diagram of a starter circuit constructed in accordance with a first embodiment.

As shown in FIG. 1, one terminal of a primary coil L1 of a current mutual-inductor L can be connected to a second electrode A2 of a triac T. The other terminal of the primary coil L1 can be connected to the outlet terminal M of primary winding of a motor MD, which can be a single phase AC motor. In some embodiments, the combined outlet terminal Z of primary and secondary coils of the motor MD can be connected to the power terminal B. The two terminals of the permanently operating capacitor C can be connected to the outlet terminals M and S of the primary and secondary windings of the motor MD, respectively.

Figure 2:
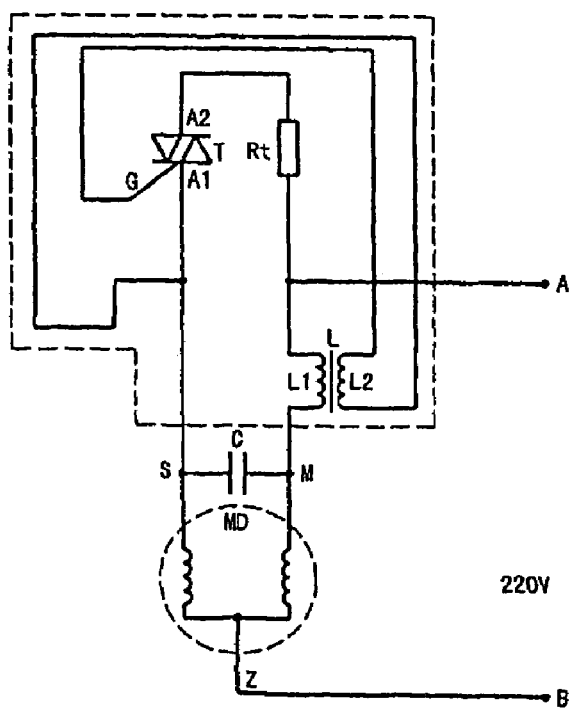
FIG. 2 is an electrical schematic diagram of a second embodiment.

As shown in FIG. 2, in some embodiments, the terminal L1 of primary coil of the current mutual-inductor L can be connected to the power terminal A and one terminal of a PTC resistor Rt. Additionally, the other terminal of the PTC resistor Rt can be connected to the second electrode A2 of the triac T.

Figure 3:
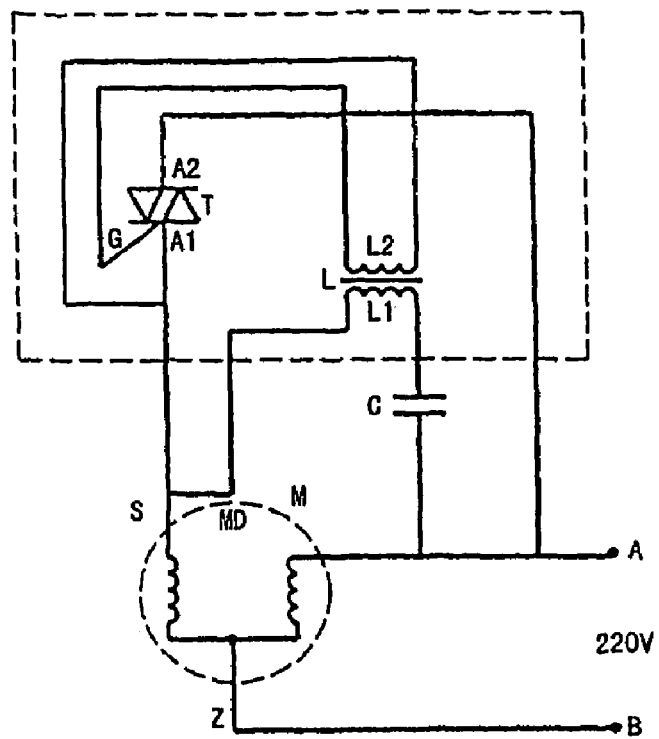
FIG. 3 is an electrical schematic diagram of a third embodiment.

As shown in FIG. 3, in some embodiments, one terminal of primary coil L1 of the current mutual-inductor L can be connected to one terminal of the permanently operating capacitor C, and the other terminal of the current mutual-inductor L can be connected to the outlet terminal S of secondary winding of the motor MD. The second electrode A2 of the triac T can be connected to the power terminal A. In some embodiments, the other terminal of the permanently operating capacitor C can be connected to the outlet terminal M of primary winding of motor MD and the power terminal A. Additionally, the combined outlet terminal Z of primary and secondary windings of motor MD can be connected to the power terminal B.

Figure 4:
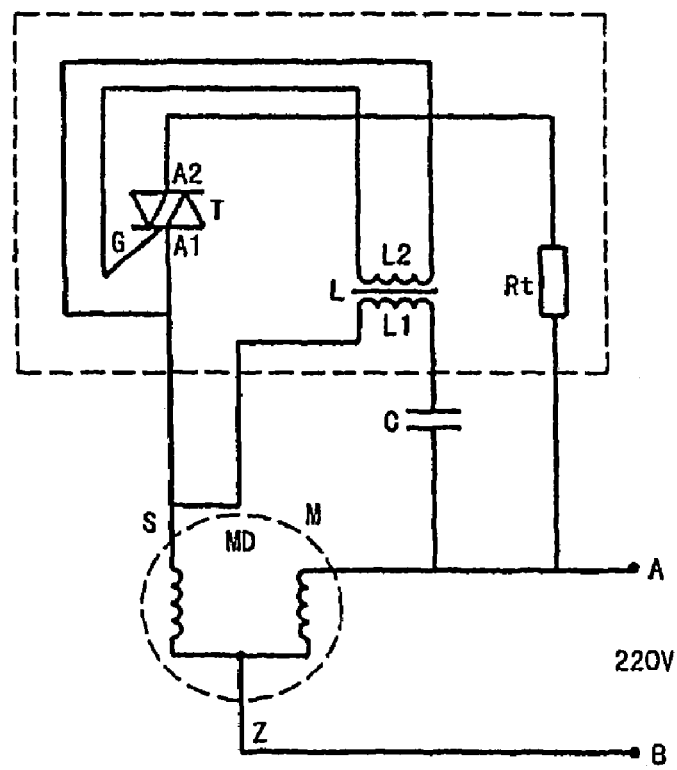
FIG. 4 is an electrical schematic diagram of a fourth embodiment.

As shown in FIG. 4, in some embodiments, one terminal of the PTC resistor Rt can be connected to the second electrode A2 of the triac T. The other terminal of the PTC resistor Rt can be connected to the power terminal A, a terminal of the permanently operating capacitor C, and the outlet terminal M of primary winding of the motor MD. The other terminal of the permanently operating capacitor C can be connected to a terminal of the primary coil L1.

Figure 5:
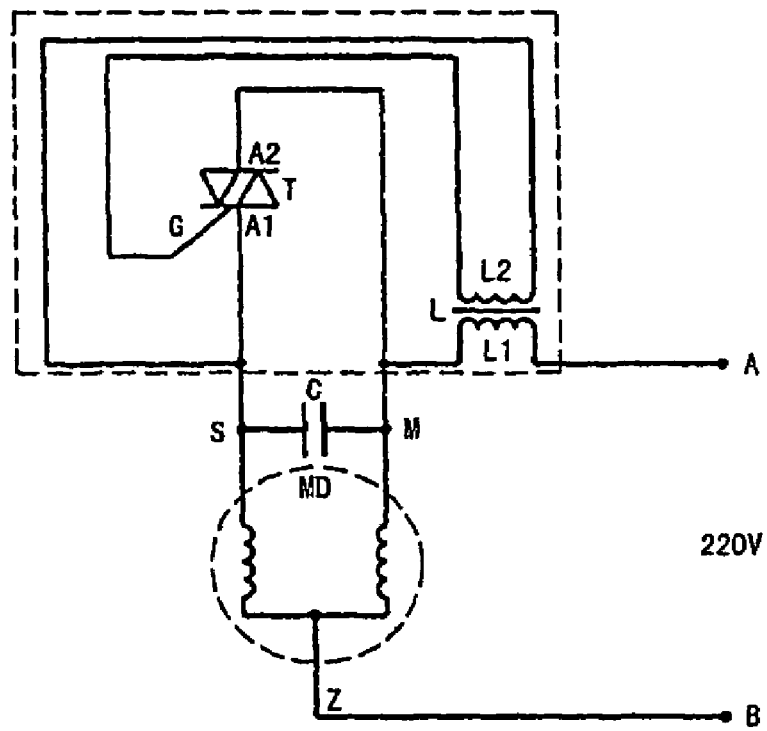
FIG. 5 is an electrical schematic diagram of a fifth embodiment.

As shown in FIG. 5, in some embodiments, one terminal of the primary coil L1 of the current mutual-inductor L can be connected to the power terminal A, and the other terminal can be connected to the outlet terminal M of primary winding of the motor MD and the second electrode A2 of the triac T. Additionally, the two terminals of the permanently operating capacitor C can be connected to the outlet terminals M and S of primary and secondary windings of the motor MD. The combined outlet terminal Z of primary and secondary windings of the motor MD can be connected to the power terminal B.

Figure 6:
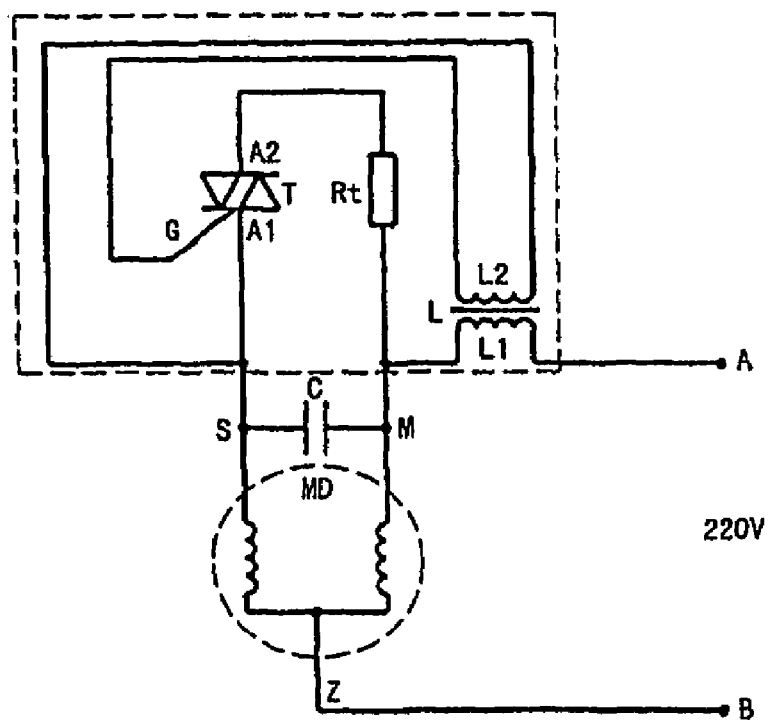
FIG. 6 is an electrical schematic diagram of a sixth embodiment.

As shown in FIG. 6, in some embodiments, one terminal of the PTC resistor Rt can be connected to the second electrode A2 of the triac T, and the other terminal is connected to the outlet terminal M of primary winding of the motor MD and the other terminal of primary coil L1 of the current mutual-inductor L.

Figure 7:
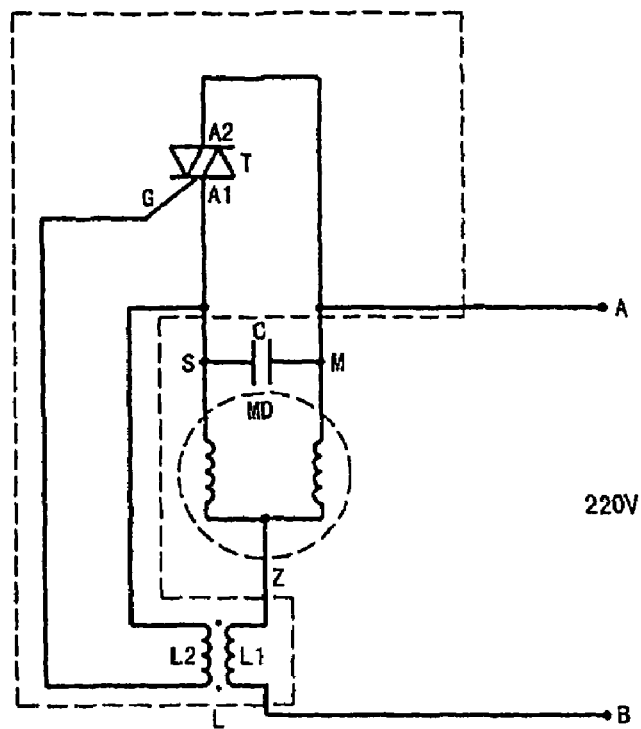
FIG. 7 is an electrical schematic diagram of a seventh embodiment.

As shown in FIG. 7, in some embodiments, one terminal of primary coil L1 of the current mutual-inductor L can be connected to the combined outlet terminal Z of primary and secondary windings of the motor MD, and the other terminal can be connected to the power terminal B. The second electrode A2 of the triac T can be connected to the power terminal A. Additionally, the outlet terminal M of primary winding of the motor MD can be connected to the power terminal A. The two terminals of the permanently operating capacitor C can be connected to the outlet terminals M and S of primary and secondary windings of the motor MD, respectively.

Figure 8:
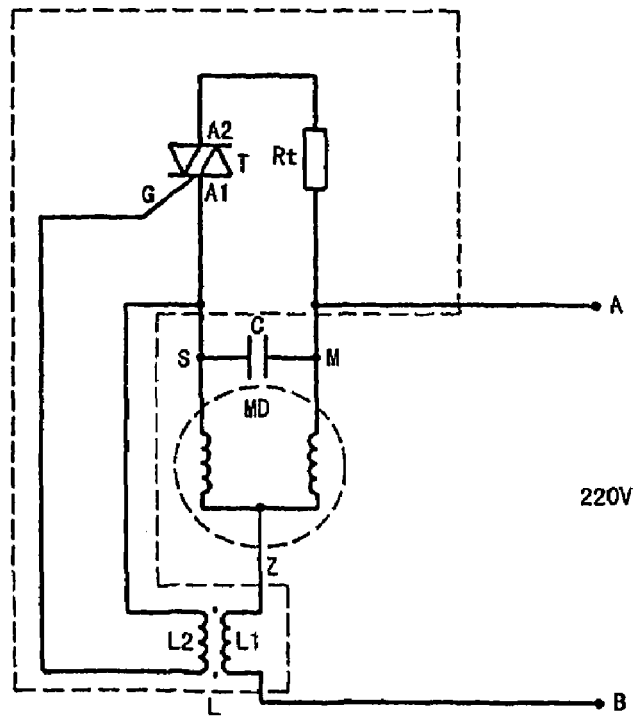
FIG. 8 is an electrical schematic diagram of an eighth embodiment.

As shown in FIG. 8, in some embodiments, one terminal of the PTC resistor Rt can be connected to the second electrode A2 of the triac T, and the other terminal can be connected to the outlet terminal M of primary winding of the motor MD and the power terminal A.

In the above embodiments, the variation of current in the primary coil L1 of the current mutual-inductor L is specific, and the phase relationship between that current and the current in the motor starting circuit is specific, depending on the motor used. By choosing from above embodiments as appropriate, the phase relationship between the gating current in the secondary coil L2 of the current mutual-inductor and the current in the motor starting circuit can be optimal, and optimal current variation characteristic can be obtained, i.e., the starting current is high enough at the beginning of motor startup and low enough after completion of motor startup, so as to trigger the triac T connected in series in the motor starting circuit.

By choosing a current mutual-inductor with appropriate parameters, the triac T can be triggered during motor startup but will not triggered during normal operation of the motor, thereby the motor starting circuit can be controlled to work only during motor startup. The current mutual-inductor L in the circuit can be chosen and adjusted by choosing the numbers of windings of primary and secondary coils L1, L2 and an iron core or magnetic core with specific performance as appropriate.

Within a short time after the motor rotor starts to speed up, the motor MD can ensure the triac T switches from gate-on state to gate-off state, i.e., the current output from the current mutual-inductor L must drop automatically to a level that the triac T can't be triggered, so as to disconnect the starting circuit and accomplish motor startup.

The current in the primary coil L1 of the above current mutual-inductor L behaves specifically, depending on the motor MD, and might not certainly drop automatically to a level that the current output from secondary coil L2 of the current mutual-inductor L can't trigger the triac at the time the motor rotor speeds up, because, at that time, the motor startup process has not been completed and there is a fairly high starting current remaining in the motor starting circuit. If the current in the primary coil L1 of the current mutual-inductor L drops automatically to the level that the current output from the secondary coil L2 can't trigger the triac T, the basic circuit shown in FIGS. 1, 3, 5, and 7 can accomplish motor startup, without any auxiliary circuit. However, if the current can't drop automatically to the level that the triac T can't be triggered, a PTC resistor can be connected in series in the electric starting circuit to provide assistance in the motor startup process, as shown in FIGS. 2, 4, 6, and 8.

With reference to FIGS. 2, 4, 6, and 8, at the time the motor MD begins to start, the current output from the current mutual-inductor L triggers the triac T in the starting circuit, and thereby the starting circuit begins to work. As the high starting current from secondary winding of the motor MD passes through the PTC resistor in the starting circuit, the PTC resistor generates heat quickly and thereby the resistance increases quickly. When the temperature in the PTC resistor reaches its Courier point, the resistance reaches to the maximum value, which is enough to disconnect the motor starting circuit. Now, the motor MD enters into normal operation state. After that, as regulated by the foresaid principle for selection and adjustment of the current mutual-inductor L, the current output from secondary coil L2 of the current mutual-inductor L can't trigger the triac T. Therefore, the motor starting circuit is disconnected completely, and the PTC resistor loses current and thereby its temperature begins to drop. When the temperature in the PTC resistor drops to a value near the temperature in the working environment, it is impossible that the triac T in the starting circuit can be triggered by current output from secondary coil L2 of the current mutual-inductor L, since the motor MD is in normal operation state. Thus, there is no current passing through the PTC resistor, and thereby the PTC resistor will not generate heat before the motor MD stops and restarts; in that way, the motor starting circuit will keep in that state, until the motor MD stops.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An inductive contactless starter for single-phase AC motor, the single-phase AC motor comprising a stator composed of at least a primary winding and a secondary winding, the inductive contactless starter comprising a current mutual-inductor having at least a primary coil and a secondary coil, and a triac having a gate electrode, a first electrode, and a second electrode, wherein the gate electrode is connected to a first terminal of the secondary coil, the first electrode is connected to a second terminal of the secondary coil and a first outlet terminal of the secondary winding, and the second electrode is connected to a first power source and a first outlet terminal of the primary winding, wherein a first terminal of the primary coil is connected to the first outlet terminal of the secondary winding, and wherein the single-phase AC motor comprises a permanently operating capacitor connected between a second terminal of the primary coil and the first outlet terminal of the primary winding.

2. The inductive contactless starter for single-phase AC motor as in claim 1, wherein the second electrode of the triac is connected to a first power terminal of the first power source.

3. The inductive contactless starter for single-phase AC motor as in claim 2 additionally comprising a PTC resistor, wherein one terminal of the PTC resistor is connected to the second electrode of the triac, and the other terminal of the PTC resistor is connected to the first power terminal.

4. An inductive contactless starter for single-phase AC motor, the single-phase AC motor comprising a stator composed of at least a primary winding and a secondary winding, the inductive contactless starter comprising a permanently operating capacitor connected between the first outlet terminal of the secondary winding and a first outlet terminal of the primary winding, and a current mutual-inductor having at least a primary coil and a secondary coil and a triac having a gate electrode, a first electrode, and a second electrode, wherein the gate electrode is connected to a first terminal of the secondary coil, the first electrode is connected to a first outlet terminal of the secondary winding and a second terminal of the secondary coil, and the second electrode is connected to a first terminal of the primary coil, wherein the second terminal of the primary coil is connected to a first power terminal and the first terminal of the primary coil is connected to the first outlet terminal of the primary winding.

5. An inductive contactless starter for single-phase AC motor comprising:
- a single-phase AC motor comprising a stator composed of at least a primary winding and a secondary winding;
- a current mutual-inductor having at least a primary coil, a secondary coil;
- a triac having a gate electrode, a first electrode, and a second electrode, wherein the gate electrode is connected to a first terminal of the secondary coil, the first electrode is connected to a first outlet terminal of the secondary winding, and the second electrode is connected to a first outlet terminal of the primary winding and a first power terminal; and
- a permanently operating capacitor connected between the first outlet terminal of the primary winding and the first outlet terminal of the secondary winding;
- wherein a first terminal of the primary coil is connected to a second power terminal and a second terminal of the primary coil is connected to second outlet terminals of the primary winding and the secondary winding, and a second terminal of the secondary coil is connected to the first outlet terminal of the secondary winding.

* * * * *